US005722632A

United States Patent [19]

Rader et al.

[11] Patent Number: 5,722,632

[45] Date of Patent: Mar. 3, 1998

[54] TEMPERATURE-COMPENSATED EXHAUST GAS RECIRCULATION SYSTEM

[75] Inventors: Richard K. Rader, West Bloomfield, Mich.; James David Warren, Clayton, N.C.

[73] Assignee: Borg-Warner Automotive, Inc., Sterling Heights, Mich.

[21] Appl. No.: 425,402

[22] Filed: Apr. 20, 1995

[51] Int. Cl.$^6$ .......................... F16K 31/06; H01H 47/26

[52] U.S. Cl. ...................... 251/129.15; 123/571; 361/165

[58] Field of Search ...................... 251/129.01, 129.15; 123/571; 361/165

[56] References Cited

U.S. PATENT DOCUMENTS

| | | | |
|---|---|---|---|
| 2,160,823 | 6/1939 | Black | 361/165 |
| 2,533,287 | 12/1950 | Schmitt | 361/165 |
| 2,567,827 | 9/1951 | Stoller | 361/165 |
| 3,207,984 | 9/1965 | Tolliver | 361/165 X |
| 3,619,703 | 11/1971 | Yamashita | 361/165 X |
| 4,522,371 | 6/1985 | Fox et al. | 251/139 |
| 4,638,784 | 1/1987 | Ikeda | 123/571 |
| 4,944,276 | 7/1990 | House et al. | 123/520 |
| 4,986,246 | 1/1991 | Kessler de Vivie et al. | 123/520 |
| 5,237,980 | 8/1993 | Gillier | 123/520 |

FOREIGN PATENT DOCUMENTS

| | | |
|---|---|---|
| 0105808 | 4/1984 | European Pat. Off. . |
| 0124399 | 11/1984 | European Pat. Off. . |
| 4205563 | 8/1993 | Germany . |
| 4308479 | 9/1993 | Germany . |

OTHER PUBLICATIONS

Ketema Rodan Applications Brochure, date unknown.

*Primary Examiner*—John Rivell
*Attorney, Agent, or Firm*—Reising, Ethington et al; Greg Dziegielewski

[57] ABSTRACT

An exhaust gas recirculation (EGR) system (10) includes a proportional solenoid valve (28) that regulates vacuum pressure to a vacuum-actuated EGR valve (12). The proportional solenoid valve (28) includes an inductive coil (30) that generates a magnetic field when energized. An electronic control unit (26) energizes the coil (30) with a fixed-frequency pulse-width modulated signal. The periodic magnetic field drives a ferromagnetic armature valve (44) open and closed—alternately admitting then closing-off a flow of atmospheric-pressure air that is used to alter the vacuum pressure output to the EGR valve (12). The vacuum pressure is dependent upon the amount of current flowing through the coil (30) during each pulse. The resistance of the coil (30) is temperature-dependent and to maintain the current in the coil (30) constant over temperature, the coil (30) is connected in series with a resistive combination of circuit elements (48) having a temperature coefficient of resistance that is opposite that of the coil (30). The resistive combination of circuit elements includes a temperature-stable resistor (50) connected across a thermistor (48) to modify the temperature-response curve of the thermistor to more closely offset that of the coil (30).

5 Claims, 3 Drawing Sheets

TEMPERATURE-COMPENSATED EXHAUST GAS RECIRCULATION SYSTEM

TECHNICAL FIELD

This invention relates to electropnuematic converters used in exhaust gas recirculation (EGR) systems for automotive vehicles to regulate vacuum pressure provided to an EGR valve.

BACKGROUND OF THE INVENTION

Electropneumatic converters of the type contemplated herein include electrically-energized and controlled solenoid valves, or "proportional" solenoid valves. Proportional solenoid valves are used in EGR systems to provide pneumatic control of the EGR valve by way of an output vacuum signal that is generated in response to an electrical input. Typically, the electrical input signal takes the form of a fixed-frequency pulse-width modulated signal.

Proportional solenoid valves use inductive coils that generate magnetic fields when energized. The periodic magnetic field of a typical proportional solenoid valve drives a ferromagnetic armature valve between open and closed positions—alternately admitting then closing-off a flow of atmospheric-pressure air at the frequency of the electrical input signal.

An inductive coil includes windings of electrically conductive wire, typically copper. The resistance of the coil wire changes with temperature. The electric potential, e.g., battery voltage, of the pulse train applied to the coil remains relatively constant and any increase in coil wire resistance results in a proportional decrease in electric current passing through the coil. Likewise, any decrease in coil wire resistance results in a proportional increase in electric current passing through the coil. Changes in current through the coil change the strength of the magnetic field. Changes in magnetic field strength change output vacuum pressure to the EGR valve. Therefore, as the temperature of the coil changes, the output vacuum pressure changes.

It is desirable for a proportional solenoid valve to include some means to compensate for changes in coil resistance that result from temperature changes. Current proportional solenoid valves either do not compensate for temperature changes or do so with closed-loop control. For example, U.S. Pat. No. 4,522,371 to Fox et al., issued Jun. 11, 1985, (the Fox et al. patent) discloses a proportional solenoid valve including an inductive coil that, when energized, produces a magnetic field. An armature in the form of an annular magnetic closure member is disposed adjacent the coil and is movable under the influence of the magnetic field to adjust the vacuum pressure output of the solenoid valve.

The inductive coil has a coil resistance value that varies with temperature. The proportional solenoid valve does not include any compensation for these variations. Instead, the Fox et al. patent discloses that proportional solenoid valves of this type may employ an external closed-loop control system (see column 1, lines 30–50).

However, to compensate for temperature-induced coil resistance changes a closed-loop control system requires at least one remote sensor to measure exhaust gas output from the EGR valve or vacuum output from the electropneumatic converter. A microprocessor or other logic device must receive feedback signals from the sensor and be programmed to adjust the pulse width of the signal it sends to the proportional solenoid valve to maintain the output vacuum pressure at a predetermined optimum value for a given set of operating variables.

The use of closed-loop control involves considerable time and expense. For example, the addition of an output sensor requires the purchase of the sensor and wire, wiring harness modifications and the addition of a number of additional steps in an assembly-line process. In addition, a microprocessor must be purchased and programmed or an existing electronic control unit must be modified to process information from the output sensor. A closed-loop feedback system could also have stability problems and any of the various other problems associated with closed-loop control.

SUMMARY OF THE INVENTION AND ADVANTAGES

The present invention overcomes these shortcomings by providing a temperature-compensated proportional solenoid valve for regulating EGR or other vacuum pressure valves in vacuum-actuated devices. The proportional solenoid valve includes an inductive coil that, when energized, produces a magnetic field. The inductive coil has a coil resistance value that varies with temperature. A ferromagnetic armature is disposed adjacent the coil and is movable under the influence of the magnetic field to regulate the output vacuum pressure. Characterizing the invention is a resistive combination of circuit elements connected in series with the coil. The coil and the combination of circuit elements together have an overall combined resistance value that is less temperature-dependent than the coil resistance value alone.

One advantage of the present invention is that it provides immediate response to temperature changes. Changes in coil resistance are compensated for as they occur. There is no feedback delay or stability problems as may occur with closed-loop external feedback control systems.

An additional advantage is that the resistive combination of circuit elements is pre-installed. It requires no additional assembly time in an automotive assembly-line and adds very little additional time to the assembly of the proportional solenoid valve. The thermistor and temperature-stable resistor need only be fastened or soldered into place.

Moreover, the present invention compensates for temperature changes without requiring the purchase of feedback sensors or connecting wires that would otherwise be required to provide information to a microprocessor. It also saves the time required to design or modify a wiring harness. The present invention also saves additional assembly-line steps required with closed-loop systems, e.g., installing sensors and connecting wiring harness leads to the sensors.

In addition, with the present invention, there is no need to purchase and program a microprocessor or to modify an existing electronic control unit to process feedback information from feedback sensors.

BRIEF DESCRIPTION OF THE DRAWINGS

To better understand and appreciate the advantages of this invention, reference is made to the following detailed description in connection with the accompanying drawings, in which.

DETAILED DESCRIPTION OF THE PREFERRED EMBODIMENT

Figure 1:
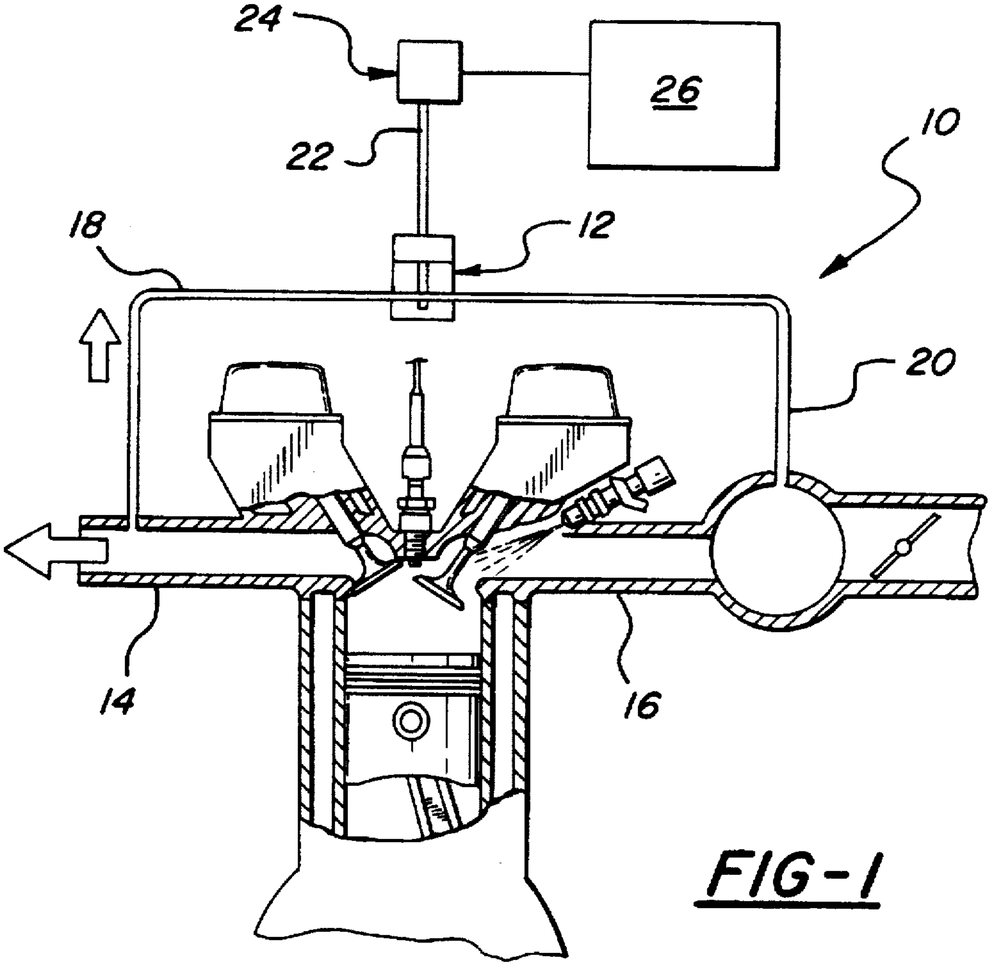
FIG. 1 is a schematic representation of an exhaust gas recirculation system of the present invention.

An exhaust gas recovery (EGR) system is generally shown at 10 in FIG. 1. The EGR system includes a vacuum-actuated exhaust gas recovery (EGR) valve, generally indicated at 12 in FIG. 1. The EGR valve 12 is connected between an exhaust manifold 14 and an air intake manifold 16 and controls the flow of exhaust gases from the exhaust manifold 14 to the air intake manifold 16. An exhaust line 18 delivers exhaust gases from the exhaust manifold 14 to the EGR valve 12. An air intake line 20 receives exhaust gases from the EGR valve 12 and delivers them to the air intake manifold 16. A vacuum line 22 transmits vacuum pressure to the valve 12. The vacuum pressure causes the EGR valve 12 to move between fully open and fully closed positions. The position of the EGR valve 12 determines the amount of exhaust gases recirculated through the air intake line 20.

The EGR system also includes an electropneumatic converter, generally indicated at 24 in FIG. 1. The electropneumatic converter 24 converts an electrical signal to a pneumatic signal. It regulates vacuum pressure output to the EGR valve 12 in response to an electrical input signal from an electronic control unit 26 or the like. The vacuum line 22 from the EGR valve 12 connects to the electropnuematic converter 24 and carries the vacuum pressure output of the electropneumatic converter 24 to the EGR valve 12.

Figure 2:
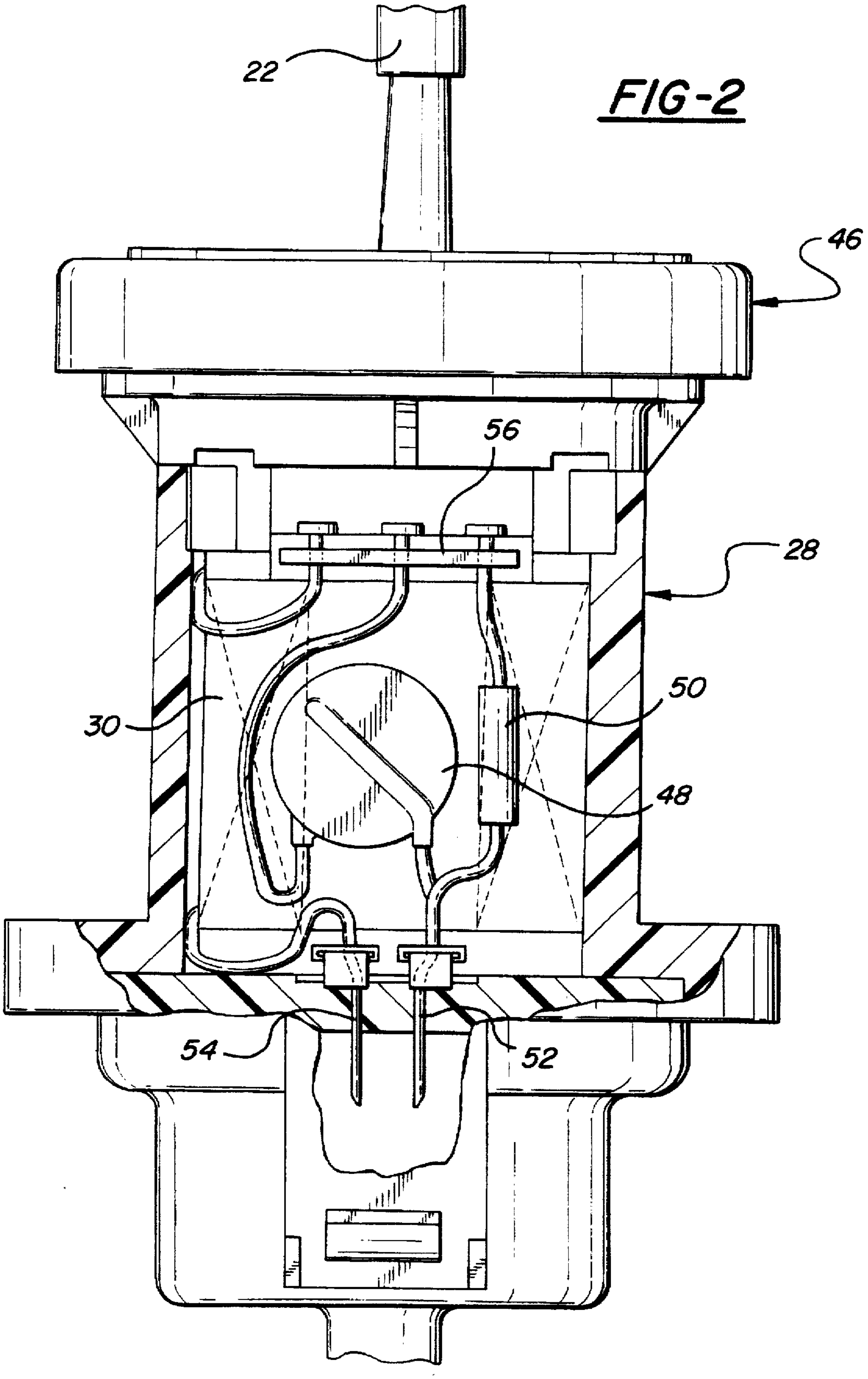
FIG. 2 is a partial cut-away front view of the proportional solenoid valve shown in FIG. 1.
Figure 3:
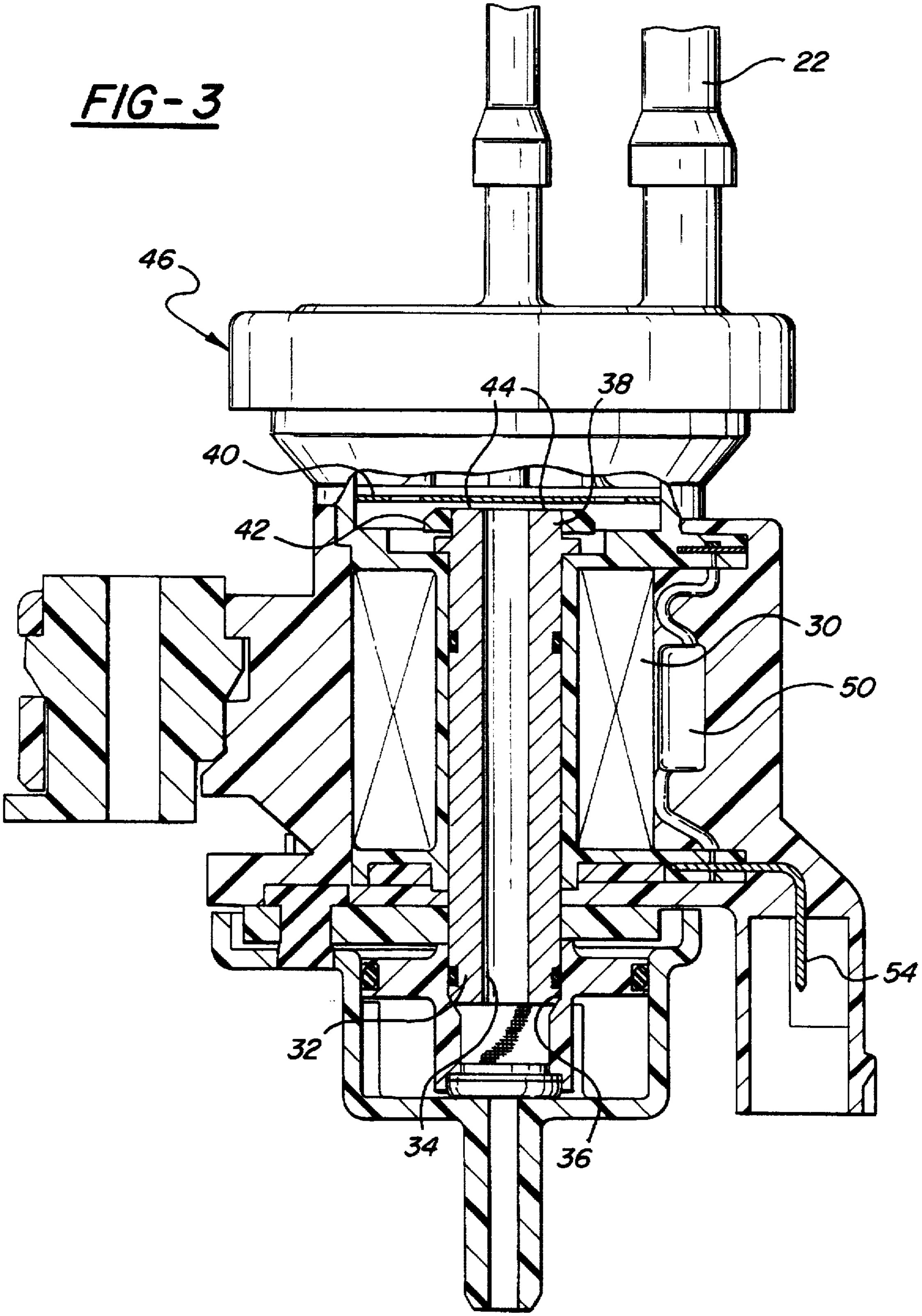
FIG. 3 is a partial cut-away cross-sectional side view of the solenoid valve of FIG. 2.

The electropneumatic converter 24 includes a canister-shaped proportional solenoid valve, generally indicated at 28 in FIGS. 2 and 3. The electropneumatic converter 24 generates an output vacuum signal to the EGR valve 12 in response to a pulse-width modulated electrical signal input to the proportional solenoid valve 28. The electropneumatic converter 24 may also be used to regulate vacuum or pressure-actuated valves in devices other than EGR valves 12.

Referring to FIG. 3, solenoid valve 28 includes an inductive coil 30 and a pole piece 32 that extends through the center of the coil 30. The pole piece 32 is fixed in position and has a hollow core 34 which serves as a conduit for allowing ambient air at atmospheric pressure to pass through from an inlet end 36 to an outlet end 38. A flat disk-shaped ferromagnetic armature 40 is disposed adjacent the coil 30 at the outlet end 38 of the pole piece 32. When the coil 30 is energized, the resulting magnetic field attracts the armature 40 such that it lies flush against a non-ferromagnetic annular seat 42 fixed to the outlet end 38. The armature 40 is movable away from the pole piece outlet end 38 forming an armature valve 44. When the armature 40 is moved away from the pole piece 32 the armature valve 44 is "open" and allows the ambient air to flow out of the outlet end 38 of the pole piece 32 from the hollow core 34.

The armature 40 moves under the influence of the magnetic field to regulate the vacuum pressure transmitted to the EGR valve 12. When the coil 30 is de-energized, the armature 40 moves away from the outlet end 38 of the pole piece 32 admitting ambient atmospheric pressure air. When the coil 30 is energized, the magnetic field pulls the armature 40 against the outlet end 38 of the pole piece 32—closing the armature valve 44 at the outlet end 38 and halting the flow of ambient air. The armature 40 shuttles between the open and the closed positions at the same frequency as the electrical input signal. Therefore, the amount of ambient air that passes through the armature valve 44 over a given period of time is determined by the pulse width of the electrical input waveform. By modulating the pulse width, the electronic control unit 26 controls the amount of ambient air that passes through the armature valve 44.

The electropneumatic converter 24 includes a saucer-shaped pneumatic section, generally indicated at 46 in FIG. 3. The pneumatic section 46 is affixed to one end of the proportional solenoid valve 28 adjacent the armature 40 where it uses the ambient air admitted through the armature valve 44 to generate an output vacuum signal. A vacuum source, such as an automotive crankcase, transmits vacuum pressure to the pneumatic section 46. The vacuum source has a nominal value of approximately 700 mBar.

As explained above, when the coil 30 is de-energized, the armature 40 moves away from the pole piece 32 and admits ambient air at atmospheric pressure to the pneumatic section 46. The pneumatic section 46 contains diaphragms and valves that transform the high frequency motion of the armature valve 44 into a vacuum output signal to the EGR valve 12. The operation of the pneumatic section 46 can be as described in detail in U.S. Pat. Nos. 4,522,371, 4,944,276, 4,986,246 and 5,237,980, all incorporated herein by reference.

Changes in current through the coil 30 change the strength of the magnetic field. Changes in magnetic field strength change output vacuum pressure to the EGR valve 12. Changes in output vacuum pressure to the EGR valve 12 change the amount of exhaust gases recirculated to the air intake manifold 16 from the exhaust manifold 14. When uncommanded changes in current through the coil. 30 cause the amount of exhaust gases recirculated to deviate from an optimum value, fuel burn becomes less complete and pollutant discharge levels increase. Therefore, current through the coil 30 must be carefully regulated.

To regulate current through the coil 30, the electrical input signal used to energize the coil 30 may originate from a control unit 26 including a microprocessors signal generator or a simple power supply. In the preferred embodiment, the nominal controlling electrical signal from the electronic control unit 26 comprises a pulse-width modulated waveform with a magnitude of 13.5 V (maximum current of 1000 mA) and a frequency of 140 Hz.

The inductive coil 30 comprises a number of turns of an electrical conductor such as copper wire. As is known, the electrical conductor wound to form coil 30 has a coil resistance value that varies with temperature. For copper wire, as the temperature of the wire increases it causes the coil resistance value to increase. In other words, the inductive coil 30 has a positive temperature coefficient of resistance.

To compensate for this temperature dependence of coil 30 and thereby maintain a constant level of current through coil 30 during each pulse, a resistive combination of circuit elements is connected in series with the coil 30.

Figure 4:
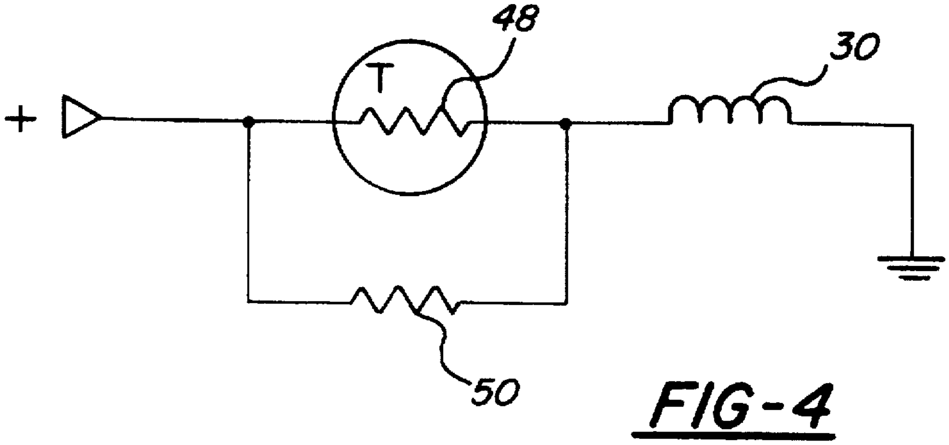
FIG. 4 is a circuit diagram of the electrical components of the solenoid valve of FIG. 2.

Referring now to FIG. 4, the resistive combination of circuit elements includes a thermistor 48 and a resistor 50 connected across the thermistor 48. The thermistor 48 has a first resistance value and a negative temperature coefficient of resistance. The resistor 50 is a wirewound temperature-stable resistor having a second resistance value. The resistor 50 is used to modify the temperature-response curve of the thermistor 48 so that the parallel combination of thermistor 48 and resistor 50 more closely offset the temperature-response curve of the coil 30.

The resistive combination of circuit elements has a resistance that exhibits a preselected negative temperature characteristic. Therefore, the variation in resistance seen across the series connection of the coil 30 and the resistive combination due to temperature changes is less than the variation in resistance of the coil 30 alone due to the temperature changes. In other words, the coil 30 and the combination of circuit elements have an overall combined resistance value that is less temperature-dependent than the coil resistance value alone.

The second resistance value, i.e., the value of the temperature-stable resistor 50, is preselected in accordance with the resistance value of the thermistor 48, the temperature coefficient of resistance of the thermistor 48, and the temperature coefficient of resistance of the coil 30. The preselected negative temperature characteristic of the resistive combination offsets the positive temperature coefficient of resistance of the coil 30. Thus, the series connection of the coil 30 and the resistive combination forms an electronic circuit that exhibits a resistance that is substantially temperature independent. As a results the current through the coil 30 remains substantially constant across a wide range of temperatures.

The coil 30 can be made of 970 turns of 27 gauge copper wire with a resistance value of 9.4 ohms at 25 degrees C. The thermistor 48 can be a SURGE-GARD™ disc thermistor, part number SG13, manufactured by Katema, Rodan Division. The resistor 50 can be a 4.5 ohm thick-film resistor, available from Metal Glaze Resistors.

This gives the electronic circuit a nominal resistance at twenty five degrees Celsius of approximately 14.1 ohms with a change in resistance from the nominal resistance of less than +/−0.7 ohms over the temperature range of −50 to +150 degrees Celsius. In other applications the electronic circuit may have different nominal resistance values and different resistance variation over a range of temperatures.

Referring to FIG. 2, a pair of terminals are used to provide electric power to the coil 30. In the preferred embodiment, the coil 30 and the resistive combination of circuit elements are connected in series between a first terminal 52 and a second terminal 54. The thermistor 48 and resistor 50 each have a first lead connected to the first terminal 52. The coil 30 has a first lead connected to the second terminal 54. The coil 30, thermistor 48 and resistor 50 each have a second lead connected together at a junction bus 56. When the circuit is energized, electrical current passes from the power supply into the first terminal 52. The current then passes through each of the thermistor 48 and resistor 50 in parallel, then through the junction bus 56, the coil 30 and thereafter out through the second terminal 54.

The resistive combination of circuit elements may be employed to counteract the positive temperature coefficient of other proportional solenoid valves. Examples of other proportional solenoid valves that may employ the resistive combination of circuit elements are shown in U.S. Pat. Nos. 4,522,371, 4,944,276, 4,986,246 and 5,237,980, all incorporated herein by reference.

This is an illustrative description of the invention using words of description rather than of limitation. Obviously, it is possible to modify this invention in light of the above teachings. Within the scope of the claims, where reference numerals are merely for convenience and are not limiting, one may practice the invention other than as described.

We claim:

1. In an exhaust gas recovery system (10) of the type that includes a vacuum-actuated exhaust gas recovery (EGR) valve (12) connected between an exhaust manifold (14) and an air intake manifold (16) to provide at controlled flow of exhaust gases to said air intake manifold (16) and a proportional solenoid valve (28) to regulate vacuum pressure to said EGR valve (12), said proportional solenoid valve (28) comprising:

an inductive coil (30) having a number of turns of an electrical conductor, whereby a magnetic field is produced upon energization of said coil (30); and a ferromagnetic armature (40) disposed adjacent said coil (30);

wherein said electrical conductor has a positive temperature coefficient of resistance, and wherein said ferromagnetic armature (40) is movable under the influence of the magnetic field to regulate said vacuum pressure transmitted to said EGR valve (12), characterized in that:

said coil (30) is connected in series with a resistive combination of circuit elements that includes a first resistive element (48) and a second resistive element (50) connected across said first resistive element (48), with said first resistive element (48) having a first resistance value and a negative temperature coefficient of resistance and said second resistive element (50) comprising a wirewound resistor having a second resistance value that is substantially temperature-independent, wherein said resistive combination of circuit elements (48, 50) has a resistance that exhibits a preselected negative temperature characteristic which offsets said positive temperature coefficient of resistance of said coil (30), and wherein said coil and said resistive combination together form an electronic circuit the has a nominal resistance at twenty five degrees Celsius and that exhibits a change in resistance from said nominal resistance of less than +/−0.7 ohms over the temperature range of −50 to +150 degrees Celsius.

2. An exhaust gas recovery system (10) as defined in claim 1, wherein said second resistance value is preselected in accordance with said first resistance value, said temperature coefficient of resistance of said first resistive element (48), and said temperature coefficient of resistance of said coil (30).

3. An exhaust gas recovery system (10) as defined in claim 1, said solenoid further comprising a plurality of terminals (52, 54) for providing electric power to said coil (30), wherein said coil (30) and said resistive combination (48, 50) are connected in series between said terminals (52, 54).

4. An exhaust gas recovery system (10) as defined in claim 1, wherein said first resistive element comprises a thermistor (48).

5. In a proportional solenoid valve (28) of the type for regulating vacuum pressure valves in vacuum-actuated devices by generating an output vacuum signal in response to an electrical input current, said proportional solenoid valve (28) comprising:

an inductive coil (30), whereby energization of said coil (30) produces a magnetic field, said inductive coil (30) having a coil resistance value that varies with temperature;

a ferromagnetic armature (40) disposed adjacent said coil (30) and movable under the influence of the magnetic field to regulate said output vacuum signal; said proportional solenoid valve (28) being characterized by:

a resistive combination of circuit elements (48, 50) connected in series with said coil (30), said resistive combination including a wirewound resistor and a resistive element having a resistance value that varies with temperature;

wherein said coil and said resistive combination together form an electronic circuit that has a nominal resistance at twenty five degrees Celsius and that exhibits a change in resistance from said nominal resistance of less than +/−0.7 ohms over the temperature range of −50 to +150 degrees Celsius.

* * * * *